(12) United States Patent
Yajima et al.

(10) Patent No.: US 7,912,373 B2
(45) Date of Patent: Mar. 22, 2011

(54) OPTICAL MULTIPLE TRANSMISSION METHOD, OPTICAL NETWORK AND OPTICAL TRANSMISSION APPARATUS

(75) Inventors: Yusuke Yajima, Yokohama (JP);
Takashi Mori, Yokohama (JP);
Masatoshi Shibasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/519,215

(22) Filed: Sep. 11, 2006

(65) Prior Publication Data

US 2007/0110445 A1     May 17, 2007

Related U.S. Application Data

(63) Continuation of application No. 09/925,961, filed on Aug. 9, 2001, now Pat. No. 7,133,614.

(51) Int. Cl.
*H04B 10/00* (2006.01)
(52) U.S. Cl. .......................... 398/83; 398/45
(58) Field of Classification Search ..................... 398/83
See application file for complete search history.

(56) References Cited

U.S. PATENT DOCUMENTS

| 6,519,060 | B1 * | 2/2003 | Liu ................................. 398/49 |
| 7,133,614 | B2 | 11/2006 | Yajima et al. ................... 398/48 |
| 7,167,611 | B2 * | 1/2007 | Chaudhuri et al. ............. 385/17 |

FOREIGN PATENT DOCUMENTS

| CN | 1205817 | 1/1999 |
| JP | 9214468 | 8/1997 |

OTHER PUBLICATIONS

Cover page and related excerpts from "Optical Networks", by Ramaswami et al., 1997.

* cited by examiner

*Primary Examiner* — Agustin Bello
(74) *Attorney, Agent, or Firm* — Sofer & Haroun, LLP (57) ABSTRACT

In a known wavelength multiplexer, optical signals to pass are passed with their wavelengths held identical. Therefore, unless an unused wavelength common to all zones exists in case of setting an optical channel, the channel cannot be set. According to the present invention, a drop/add type wavelength multiplexer includes a wavelength converting section (50 in FIG. 5) which converts the wavelengths of optical signals to pass from the input side of the multiplexer to the output side thereof. In a network employing the wavelength multiplexers at individual nodes, a new optical channel can be easily set by utilizing wavelengths not used at the nodes.

6 Claims, 11 Drawing Sheets

——— : WAVELENGTH-MULTIPLEXED SIGNAL
------- : OPS SUPERVISORY CONTROL SIGNAL

OPTICAL MULTIPLE TRANSMISSION METHOD, OPTICAL NETWORK AND OPTICAL TRANSMISSION APPARATUS

RELATED APPLICATIONS

This is a continuation of U.S. patent application Ser. No. 09/925,961, entitled "OPTICAL MULTIPLE TRANSMISSION METHOD..." filed on Aug. 9, 2001 now U.S. Pat. No. 7,133,614.

BACKGROUND OF THE INVENTION

The present invention relates to a wavelength multiplexing transmission method and an optical network in which a plurality of optical signals of different wavelengths are multiplexed and transmitted, and an optical transmission apparatus which can be used for the transmission method and the optical network.

Heretofore, a method as stated below has been known as an expedient for extending a ring network based on wavelength multiplexing technology. It is contained in, for example, Rajiv Ramanswasmi and Kumar N. Sivarajan: "Optical Networks—A Practical Perspective—" published by Morgan Kaufmann Publishers, page 449. A general construction for the method has been as shown in, for example, FIG. 10. 15 in the book. The method is founded on the construction that, in case of realizing a ring network of the type which drops or adds only specific wavelengths, optical signals of wavelengths propagating via a certain node apparatus are outputted at the same wavelengths as the inputted wavelengths. Accordingly, a practicable node apparatus is constructed including a dropping section in which any signals are derived from a wavelength demultiplexing unit located on the input side of the node apparatus and are outputted outside, and an adding section in which optical signals given from outside are connected to a wavelength multiplexing unit located on the output side of the node apparatus. Herein, the certain wavelength signals delivered from the wavelength demultiplexing unit are directly delivered to the wavelength multiplexing unit as the signals having the same wavelengths. Thus, the optical signals which are dropped or added by the apparatus itself are externally outputted or inputted via the dropping section or the adding section. On this occasion, the apparatus does not drop or add any wavelengths for itself, but it transmits the optical signals inputted for other apparatuses, from one side to the other side thereof without changing the wavelengths of the optical signals. Although the network of ring scheme (ring network) is exemplified here, a similar method is known also in a linear network. The "linear network" is a network architecture wherein node apparatuses are arrayed in one row, and wherein optical signals of any wavelengths are dropped or added by the node apparatuses arranged midway.

Figure 1:
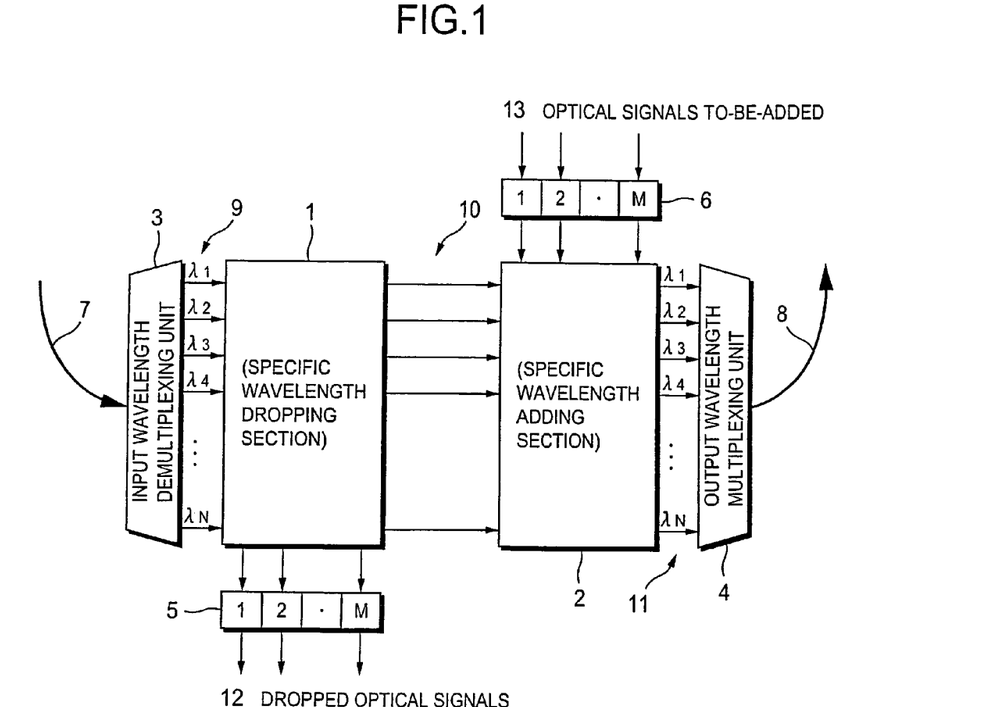
FIG. 1 is a block diagram showing an example of construction of a drop/add type wavelength multiplexer in the prior art.

Next, a node apparatus for such a network will be concretely exemplified. FIG. 1 shows an example of the node apparatus which has a wavelength multiplexing function and which incarnates the dropping and adding of specific wavelengths. A wavelength dropping section includes a first space switching unit 1, a wavelength demultiplexing unit 3 and an interface unit 5 for input wavelength-multiplexed optical signal 7. The wavelength demultiplexing unit 3 demultiplexes the input wavelength-multiplexed optical signal 7 into individual wavelengths ($\lambda 1, \lambda 2, \lambda 3, \ldots, \lambda N$), which are respectively delivered to predetermined transmission lines 9. The first space switching unit 1 drops optical signal of desired specific wavelengths in the input wavelength-multiplexed optical signal 7. The interface unit 5 outputs the dropped input lights as desired dropped optical signals. Thus, the wavelength dropping section demultiplexes the input wavelength-multiplexed optical signal 7 into the individual wavelengths and drops the desired wavelengths so as to output the dropped optical signals 12.

On the other hand, a wavelength adding section includes an interface unit 6, a second space switching unit 2 and a wavelength multiplexing unit 4 for output wavelength-multiplexed optical signal 8. The interface unit 6 outputs optical signals to-be-added 13. Optical signals 10 transmitted from the first space switching unit 1, and the optical signals to be-added 13 transmitted from the interface unit 6 are delivered to predetermined transmission lines 11 via the second space switching unit 2 in accordance with connection route settings for the optical signals respectively having the individual wavelengths. The optical signals 11 of the plurality of wavelengths ($\lambda 1, \lambda 2, \lambda 3, \ldots, \lambda N$) thus delivered are wavelength-multiplexed by the output wavelength multiplexing unit 4, and the resulting optical signal is outputted as the wavelength-multiplexed optical signal 8. Here, each of the first space switching unit 1 and the second space-switching unit 2 is constructed of optical switches etc.

Figure 2:
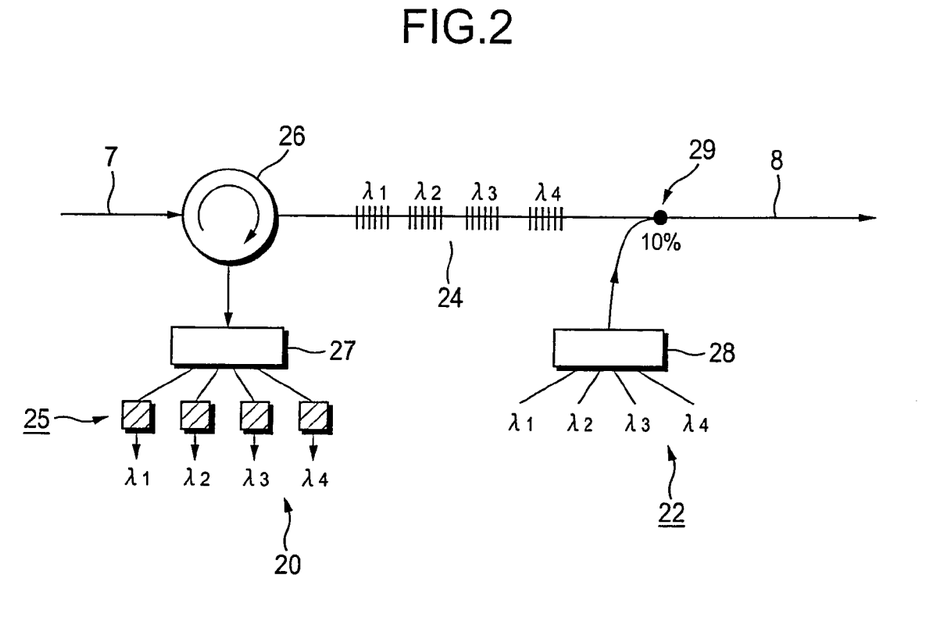
FIG. 2 is a diagram showing an example of construction of a drop/add type wavelength multiplexer which employs fiber Bragg grating technology.

Apart from the above expedient in which the dropping or adding section is constructed of the optical switches, a wavelength multiplexer of drop/add type employing "Fiber Bragg Grating" technology has also been proposed. The drop/add type wavelength multiplexer is illustrated in, for example, FIG. 3. 60 on page 172 of the aforementioned book "Optical Networks—A Practical Perspective—". The fiber Bragg grating technology is optical filter technology which utilizes periodical refractive index modulation within an optical fiber as is formed when the optical fiber doped with Ge (germanium) is irradiated with the interference fringes of ultraviolet light. The construction of the drop/add type wavelength multiplexer employing the fiber Bragg grating technology is shown in FIG. 2. A light dropping section 20 includes a circulator 26 and a splitter 27. In the circulator 26, light propagating rightwards from left is totally transmitted, whereas light propagating leftwards from right is totally reflected downward to the splitter 27 as viewed in the figure. In fiber Bragg gratings 24, only lights of wavelengths $\lambda 1, \lambda 2, \lambda 3$ and $\lambda 4$ in the rightward light are totally reflected leftwards. A light adding section 22 includes a combiner 28 and a coupler 29. In the figure, numeral 7 indicates the input wavelength-multiplexed optical signal, and numeral 8 indicates the output wavelength-multiplexed optical signal.

With the fiber Bragg grating technology, the optical signals of the specific wavelengths are derived by a diffraction grating at an input stage in a state where the wavelengths are multiplexed as they are.

It is common to both the dropping/adding methods stated above that the wavelengths of optical signals which are transmitted remain unchanged.

A network wherein a plurality of node apparatuses of the type dropping and adding optical signals of specific wavelengths are connected, has a difficulty as explained below.

In the network wherein the plurality of apparatuses dropping and adding the optical signals of specific wavelengths are connected in a ring scheme or a linear scheme, a request for connecting an optical channel is generally made by designating any two of the plurality of apparatuses which constitute the whole network. In that case, regarding which of wavelengths is to be used for the connection, a wavelength not used in any zone is selected in accordance with the situation of uses of the wavelengths in all zones. Various algorithms corresponding to the individual aspects of uses have been proposed for the selection. Typical examples of the algorithms are as follows: The first example is a method wherein fixed Nos. denoted by natural numbers are assigned to wavelengths usually applied, and wherein an unused wavelength is selected from the smaller one of the Nos. The second example is a method wherein any wavelength is selected from among unused wavelengths by employing a random number.

In an actual transmission circuit, however, a problem is posed as stated below. In general, requests for channels to be connected are not fully determined at the time of the construction of the network. Accordingly, the optical channels of the transmission circuit are added or deleted in accordance with the requests for channels arising every day, and the settings of the channels need to be altered in correspondence with the addition or deletion of the optical channels.

With the prior-art technique mentioned above, it is required to select the wavelength which is not used in any of all the zones of the channel. Accordingly, when a request for connection has occurred in a certain channel, a wavelength which is not used in any of the zones included from a certain apparatus to another apparatus must be selected. In the nonexistence of such a wavelength, the optical transmission channel requested to be connected cannot be connected in spite of the existence of unused wavelengths in the individual zones.

Figure 3:
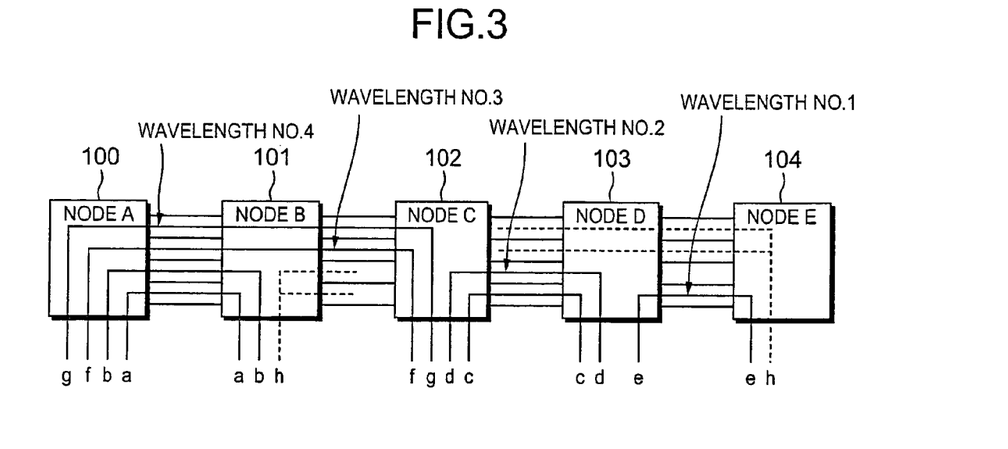
FIG. 3 is a diagram for explaining a prior-art method of setting wavelength routes in drop/add type wavelength multiplexing transmission.

This state is shown in FIG. 3. The figure exemplifies an optical network in the case where node apparatuses A-E, i.e. five apparatuses 100, 101, 102, 103 and 104 are connected in one row. Letters a, b, c, . . . and h indicate channels which are respectively connected to the node apparatuses. The respectively adjacent apparatuses are connected by a multiplex channel of four wavelengths. That is, the multiplex channel can accommodate, up to, four optical channels. Incidentally, the case of the four wavelengths is mentioned here, but in general, the number of wavelengths is not especially restricted. Besides, although the node apparatuses are connected in one row in the example of FIG. 3, the same holds true even when node apparatuses are connected in a ring shape or in a mesh shape. Further, the algorithm of minimum value selection as is the simplest algorithm shall be adopted here. Also, a request for a channel shall be an additional request in the ensuing description.

It is now assumed that requests for connections have occurred in the order of the channels a, b, c, d, . . . and g. Then, the wavelengths of the smallest Nos. usable in compliance with the requests for the connections of the channels are selected on the basis of the algorithm of the minimum value selection. Thus, the seven channels from the channel a to the channel g are set as shown in FIG. 3. By way of example, the channel a connects the node apparatuses A and B, and the wavelength of wavelength No. 1 is used for the channel. The connections of the other channels are similarly understood. Here, it must be attended to that, in the case of the method which uses the same wavelengths in all the channels connected, each of the node apparatuses outputs the same wavelengths as the inputted wavelengths.

It is now considered that the request for the connection of the channel h has been further added. The channel h corresponds to the request for the connection from the node apparatus B to the node apparatus E. When the situation of uses of the wavelengths in the node apparatus C is viewed here, wavelength Nos. 3 and 4 are already used on the left side (on the side of the node apparatus B), and wavelength Nos. 1 and 2 are already used on the right side (on the side of the node apparatus E). Consequently, any wavelength usable on both the right and left sides in common does not exist in the node apparatus C. Accordingly, this example involves the problem that the channel h cannot be added though the node apparatus although C has the unused wavelengths on both the right and left sides. For adding the channel h, therefore, it is necessary to build, for example, another network of ring scheme constituted by a plurality of similar apparatuses. This means that a wavelength multiplexing capability is not fully exploited in the multiplex system of wavelength multiplexing.

SUMMARY OF THE INVENTION

The main aspects of the present invention are as follows:

In accordance with a first aspect of the present invention, there is provided an optical multiplex transmission method comprising accepting an optical signal group in which optical signals of a plurality of wavelengths are multiplexed, from a first optical transmission line; converting the optical signal of the first wavelength included in the optical signal group, into the optical signal of the second wavelength different from said first wavelength; and multiplexing at least one of the optical signals of the wavelengths except said first wavelength, included in said optical signal group, and said optical signal of said second wavelength, and then outputting the resulting multiplexed optical signals to a second transmission line.

In accordance with a second aspect, there is provided an optical multiplex transmission method comprising accepting a first optical signal group in which optical signals of a plurality of wavelengths are multiplexed, from a first optical transmission line, and a second optical signal group in which optical signals of a plurality of wavelengths are multiplexed, from a second optical transmission line; converting the optical signal of the first wavelength included in the first optical signal group, into the optical signal of the second wavelength different from said first wavelength; multiplexing at least one of the optical signals included in said first optical signal group, at least one of the optical signals included in the second optical signal group, and said optical signal of said second wavelength, and then outputting the resulting multiplexed optical signals to a third optical signal line; and multiplexing at least one of the optical signals except the optical signals to be outputted to the third optical signal line, included in said first optical signal group, and at least one of the optical signals except said optical signals to be outputted to said third optical signal line, included in said second optical signal group, and then outputting the resulting multiplexed optical signals to a fourth optical signal line.

In accordance with a third aspect, there is provided an optical multiplex transmission method comprising allowing a first node apparatus to receive a wavelength-multiplexed optical signal group; to transmit at least one of optical signals included in the optical signal group, to a second node apparatus connected with the first node apparatus; to convert the optical signal of first wavelength included in said optical signal group, into the optical signal of second wavelength different from the first wavelength; and to transmit said optical signal of the second wavelength to a third node apparatus connected with said first node apparatus.

In accordance with a fourth aspect, there is provided an optical transmission apparatus comprising an input wavelength demultiplexing unit which demultiplexes a first optical signal group including optical signals of a plurality of wavelengths inputted from a first optical fiber, into the optical signals of the respective wavelengths; a wavelength multiplexing unit which multiplexes optical signals of a plurality of wavelengths, and which outputs the resulting multiplexed optical signals to a second optical fiber; a wavelength dropping unit which outputs predetermined optical signals among said optical signals of said respective wavelengths demultiplexed by said input wavelength demultiplexing unit; a wavelength adding unit which outputs predetermined optical signals in a second optical signal group including optical signals of a plurality of wavelengths externally inputted, to said wavelength multiplexing unit; and a wavelength converting unit which converts the optical signal of first wavelength among said optical signals of said respective wavelengths demultiplexed by said input wavelength demultiplexing unit, into the optical signal of second wavelength different from the first wavelength, and which outputs said optical signal of the second wavelength to said wavelength adding unit.

Further aspects of the present invention will become apparent from the ensuing description.

The essentials of the present invention will be summed up below. The difficulty in the optical transmission described above is ascribable to the restriction of an apparatus construction that optical signals to be passed through each apparatus of any optical network must have identical wavelengths on the input side and output side of the apparatus. Here, if an optical signal of certain wavelength from the input side can be converted into an optical signal of different wavelength within the apparatus so as to externally output the resulting optical signal, and if any unused wavelengths are respectively existent on the input side and the output side, the unused wavelengths will be permitted to pass through the apparatus irrespective of whether or not these wavelengths are in agreement.

This fact holds true also of optical signals which are connected via a plurality of zones. If the apparatuses can convert the wavelengths of the optical signals to be passed, and if unused wavelengths are respectively existent in the plurality of zones desired to be connected, it is permitted to set a corresponding optical channel, irrespective of the combination of the unused wavelengths. According to such a method, the maximum number of wavelengths can be utilized between the zones, and the capability of wavelength multiplexing can be exploited to the utmost.

PREFERRED EMBODIMENTS OF THE INVENTION

Figure 4:
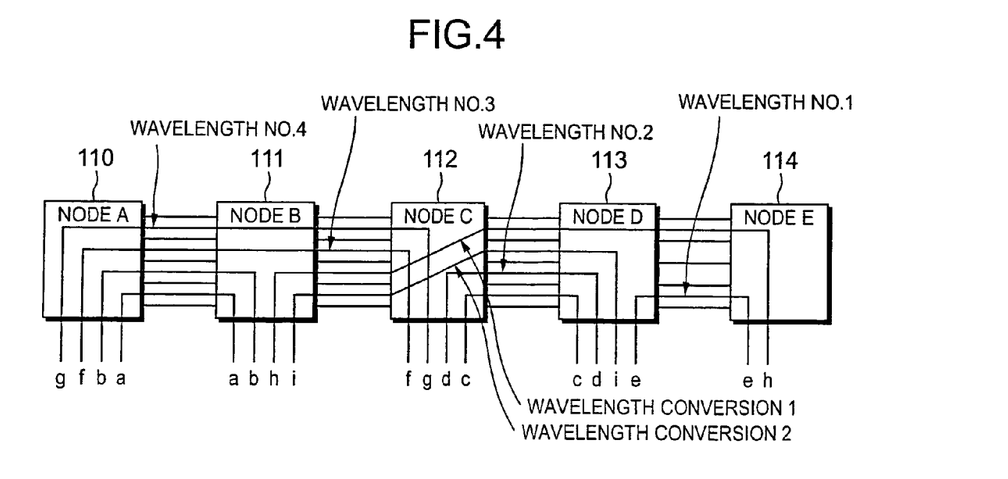
FIG. 4 is a diagram for elucidating the principle of the present invention in the drop/add type wavelength multiplexing transmission.

The principle of the present invention will be elucidated with reference to FIG. 4. The figure is a conceptual diagram of an optical network for describing the basic idea of the present invention. Likewise to FIG. 3, FIG. 4 exemplifies the optical network in the case where node apparatuses A-E, i.e. five apparatuses 110, 111, 112, 113 and 114 are connected in one row. Letters a, b, c, . . . and h indicate channels which are respectively connected to the node apparatuses. Each node apparatus is exemplified as a multiplexer of four wavelengths, and it can accommodate, up to, four optical channels. Incidentally, the case of the four wavelengths of wavelengths Nos. 1 through 4 is mentioned here, but in general, the number of wavelengths is not especially restricted in the optical network to which the present invention is directed. Besides, although the node apparatuses are connected in one row in the example of FIG. 4, the present invention is similarly applicable to a different connection scheme. The different connection scheme corresponds to, for example, a case where node apparatuses are connected in a ring shape or in a mesh shape.

The example as shown in FIG. 3 has the fundamental rule that the wavelengths propagating via the node apparatuses are the same. As explained before, under such a rule, there is the problem that any channel cannot be increased in spite of the existence of unused wavelengths in individual zones.

In contrast, according to the present invention, the above difficulty is avoided in such a way that each node apparatus converts the wavelength of the inputted light so as to output the resulting wavelength. Referring to FIG. 4, in a case where a request for connecting the channel h between the node apparatuses B and E has been received, the node apparatus C located midway executes the wavelength conversion. Owing to the wavelength conversion, the signal of wavelength No. 1 is converted into that of wavelength No. 3. It is consequently permitted to set the channel h anew. The function of this wavelength conversion is indicated as "Wavelength conversion 1" in the figure. Besides, in a case where a request for connecting a channel i between the node apparatuses B and D has been further received here, the node apparatus C similarly executes the wavelength conversion from wavelength No. 2 into wavelength No. 4. Thus, the channel, i is set. The function of this wavelength conversion is indicated as "Wavelength conversion 2" in the figure.

Now, practicable embodiments of the node apparatus itself according to the present invention will be described.

In general, the node apparatus is capable of two-way transmissions. In each of the ensuing embodiments, however, only the construction of the transmission in one way will be shown for the brevity of illustration. In order to realize the two-way transmissions, the node apparatus may include besides the construction of each embodiment, the same construction so as to reverse a transmitting direction. Further, two examples stated below are representative as a wavelength multiplexing method. The first is a one-way wavelength multiplexing system wherein wavelengths for one way are multiplexed in a single optical fiber. The second is a two-way wavelength multiplexing system wherein wavelengths for two ways are multiplexed in a single optical fiber. In the present invention, how to construct the node apparatus is similar in both the wavelength multiplexing systems.

In general, the wavelength multiplexer of the drop/add type has the function of dropping and adding up to M wavelengths relative to the number N of multiplexed wavelengths. Here, letter N denotes a natural number, and letter M also denotes a natural number which is equal to or less than the number N. In the wavelength multiplexer shown in FIG. 1, signals demultiplexed into the respective wavelengths of input optical signal 7 by the wavelength demultiplexing unit 3 of a specific wavelength dropping section are derived from the specific wavelength dropping section 2 (first space switching unit 1), and they are delivered as dropped optical signals outside the apparatus. On the other hand, optical signals to be added 13 from outside are inputted to a specific wavelength adding section (second space switching unit 2), from which they are delivered to an output wavelength multiplexing unit 4. Such operations of the wavelength multiplexer are set as dropping, adding and transmitting operations in each node apparatus on the basis of the situation of settings of channels in the whole network.

Figure 5:
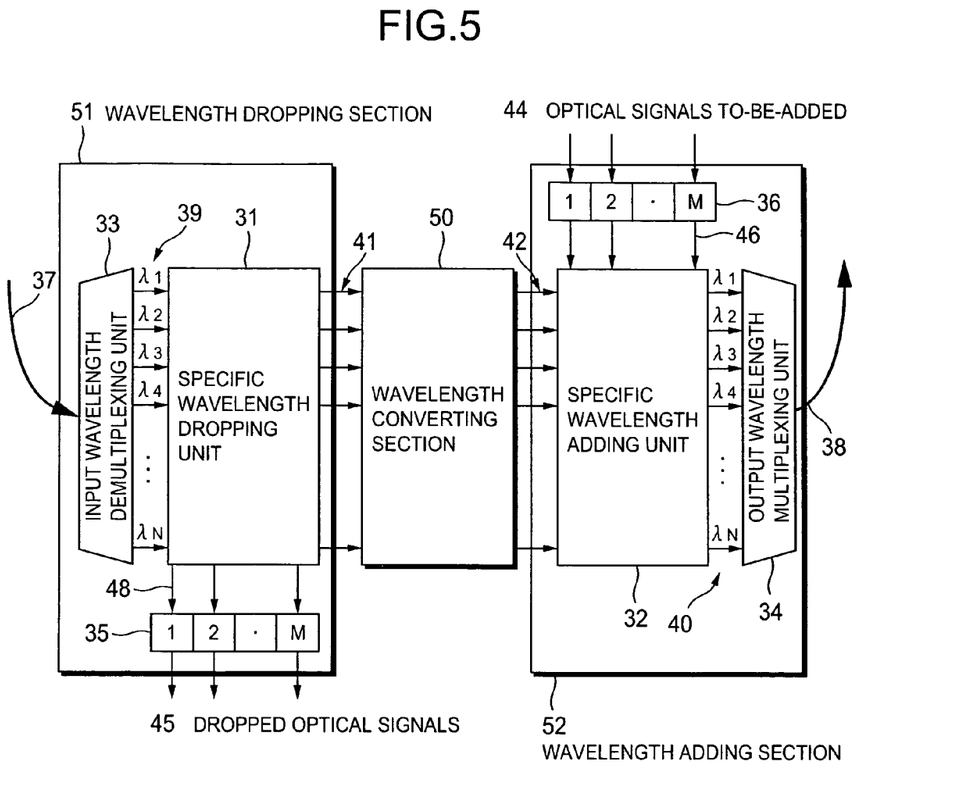
FIG. 5 is a block diagram showing the construction of a drop/add type wavelength multiplexer in an embodiment of the present invention.

FIG. 5 is a schematic block diagram of one embodiment of the node apparatus. Signals 39 of respective wavelengths demultiplexed by an input wavelength demultiplexing unit 33 are first inputted to a specific wavelength dropping unit 31. Subsequently, optical signals 45 of wavelengths to be outputted as dropped optical signals are derived. On the other hand, optical signals to-be-added 44 from outside the node apparatus are inputted to a specific wavelength adding unit 32, and they are multiplexed by an output wavelength multiplexing unit 34. A wavelength converting section 50 for wavelength conversion from input wavelengths into output wavelengths is interposed between the specific wavelength dropping unit 31 and the specific wavelength adding unit 32. Here, the wavelength converting section 50 has the function of converting the wavelengths of optical signals to-be-delivered in a manner to transmit the optical signals from the specific wavelength dropping unit 31 to the specific wavelength adding unit 32, without dropping or adding the optical signals. Thus, the node apparatus in the network architecture shown by way of example in FIG. 4 is permitted to receive the specific input wavelength signals and to deliver the different output wavelength signals.

In the node apparatus of this embodiment, except the wavelength converting section 50, a wavelength dropping section 51 and a wavelength adding section 52 input/output signals roughly in the same manner as in the foregoing node apparatus shown in FIG. 1. More specifically, the wavelength dropping section 51 includes the wavelength demultiplexing unit 33 for input wavelength-multiplexed optical signal 37, the first switching unit (or specific wavelength dropping unit) 31 and a filtering unit 35. For example, the wavelength demultiplexing unit 33 and the specific wavelength dropping unit 31 are connected by an optical waveguide. The wavelength demultiplexing unit 33 demultiplexes the input wavelength-multiplexed optical signal 37 into optical singlans of the respective wavelengths ($\lambda 1$, $\lambda 2$, $\lambda 3$, ... and $\lambda n$). The wavelength demultiplexing unit 33 suffices with a conventional one. This wavelength demultiplexing unit 33 is constructed by employing, for example, a filter formed of a multilayer dielectric film, or a diffraction grating. The respective demultiplexed optical signals 39 are inputted to the specific wavelength dropping unit 31.

Optical signals 48 of the wavelengths dropped by the specific wavelength dropping unit 31 are outputted from the node apparatus via the filtering unit 35. On the other hand, optical signals 41 of the wavelengths passing through the wavelength dropping unit 31 are inputted to the wavelength converting section 50. In this wavelength converting section 50, the wavelengths which need to be converted are subjected to the wavelength conversion. Desired passing lights 42 which include the lights of the converted wavelengths, are inputted to the specific wavelength adding unit 32.

The wavelength adding section 52 includes the second switching unit (or specific wavelength adding unit) 32, the wavelength multiplexing unit 34 for outputting wavelength-multiplexed optical signal 38, and a filtering unit 36 for the optical signals to-be-added 44. The optical signals 42 transmitted through the wavelength converting section 50, and optical signals 46 added via the filtering unit 36 are inputted to the specific wavelength adding unit 32. Lights 40 of the plurality of wavelengths ($\lambda 1$, $\lambda 2$, $\lambda 3$, ... and $\lambda n$) outputted from the specific wavelength adding unit 32 are multiplexed by the wavelength multiplexing unit 34. The wavelength-multiplexed optical signal 38 is outputted from the apparatus.

Although all the transmitted optical signals are subjected to the wavelength conversion in the embodiment of FIG. 5, only some of the transmitted optical signals may well be subjected to the wavelength conversion. Thus, the node apparatus can be made smaller in size.

Figure 6:
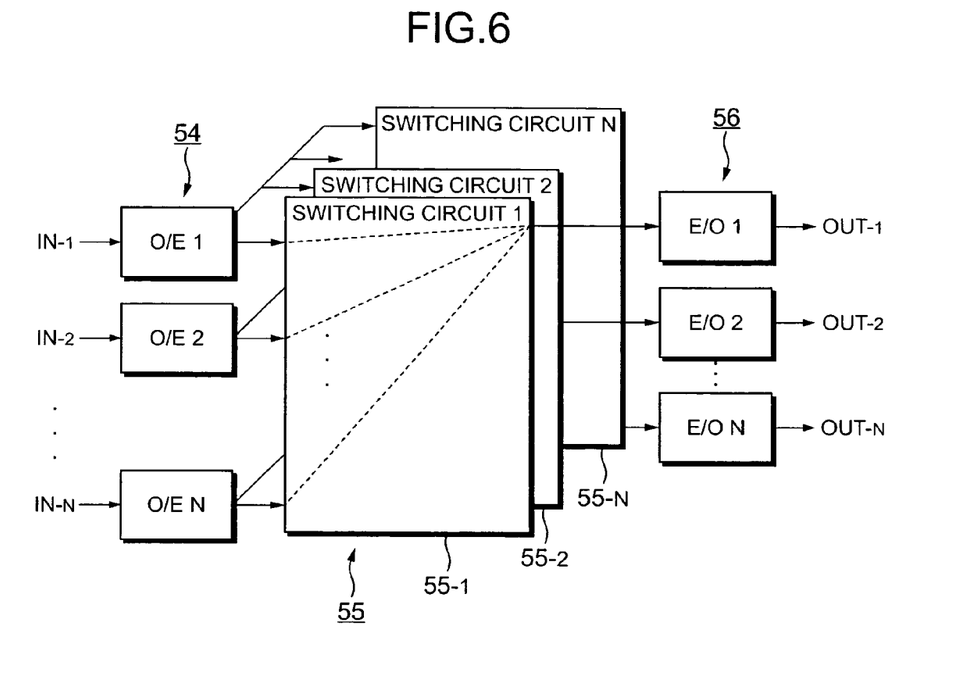
FIG. 6 is a diagram showing an example in which a wavelength converting section in the embodiment is constructed of electric switches.

Here, the wavelength dropping unit or first space switching unit 31, and the wavelength adding unit or second space switching unit 32 suffice with conventional members. They are constructed of, for example, optical switches etc. The construction of the wavelength converting section 50 may be any of, for example, one which uses electric signals for the conversion, and one which uses optical signals for the conversion. First, an example employing electric signals is shown in FIG. 6. The wavelength converting section 50 shown in FIG. 6 includes O/E conversion units 54 (O/E-1, O/E-2, ... and O/E-N), E/O conversion (E: Electrical, O: Optical) units 56 (E/O-1, E/O-2, ... and E/O-N), and electrical switching circuits 55 (55-1, 55-2, ... and 55-N) for individual wavelengths. The electrical switching circuits 55 are interposed between the O/E conversion units 54 and the E/O conversion units 56, and they select output lines of desired wavelengths. Input optical signals 1-N (IN-1, IN-2, ... and IN-N) demultiplexed into the respective wavelengths by the input wavelength demultiplexing unit 33 shown in FIG. 5 are respectively converted into electric signals by the O/E conversion units (O/E-1, O/E-2, ... and O/E-N) 54. As a result, the electric signals numbering N are obtained. Here, each of the electric signals may be handled as one signal, or it may well be deserialized into a plurality of low speed signals. All the N electric signals are inputted to each of the switching circuits 55. Then, a predetermined one of the inputted signals is selected in each of the switching circuits 55.

Here, each of the electrical switching circuits 55 is explained as having the construction of an electrical space switch. However, it can also be constructed as a time-division switch which switches the inputted electric signals in time-division fashion.

In FIG. 6, the electrical outputs of the switching circuits 1-N are respectively inputted to the E/O signal conversion units 56 (E/O-1, E/O-2, ... and E/O-N). The E/O signal conversion units 56 convert the inputted electric signals from the switching circuits 55 into optical signals (OUT-1, OUT-2, ... and OUT-N) of the respective wavelengths, and output the resulting signals toward the output wavelength multiplexing unit 34 shown in FIG. 5. The optical signals OUT-1, OUT-2, ... and OUT-N correspond to the optical signals of the wavelengths $\lambda 1$, $\lambda 2$, $\lambda 3$, and $\lambda n$, respectively. By way of example, the switching circuit 55-1 is a circuit by which any of the electrical outputs from the O/E signal conversion units 54 (O/E units) is outputted to the E/O-1 unit among the electrooptic conversion units 56. By way of example, the optical signal IN-2 (wavelength λ2) is O/E converted by the O/E-2 unit, and the resulting electric signal is outputted to the switching circuits 55. This electric signal is delivered to the E/O-1 unit among the E/O conversion units 56 by the operation of the switching circuit 1 (55-1), and the optical signal OUT-1 of the wavelength λ1 is outputted from the E/O-1 unit. That is, the optical signal IN-2 of the wavelength λ2 is wavelength-converted into the optical signal OUT-1 of the wavelength λ1. The other wavelengths λ2, λ3, . . . and λn can be also converted through the switching circuits 55 in like fashion.

Figure 7:
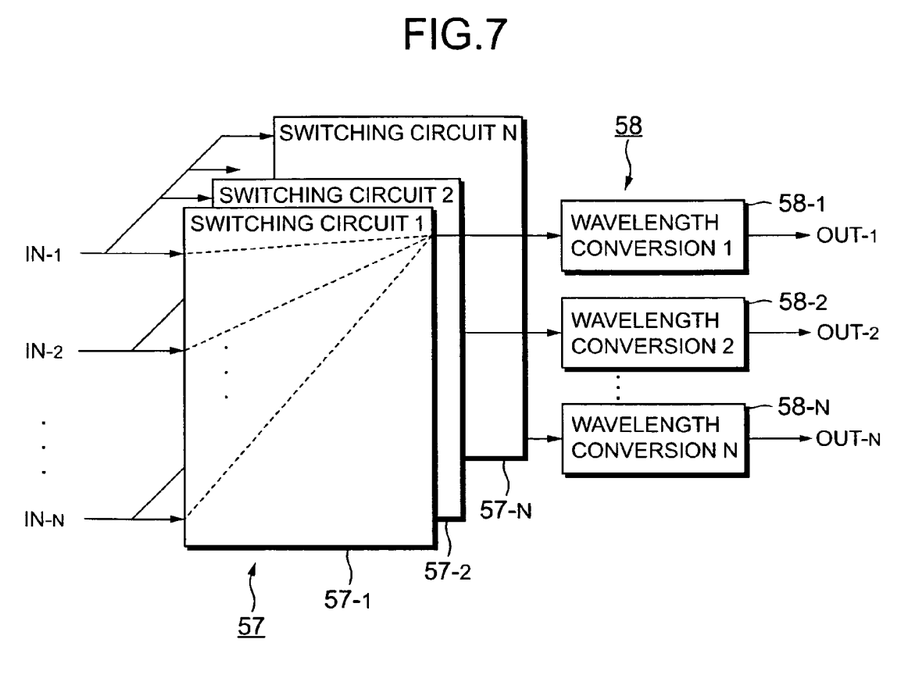
FIG. 7 is a diagram showing an example in which the wavelength converting section in the embodiment is constructed of optical switches.

Next, an example in which the wavelength converting section 50 in the present invention is constructed of optical switches is shown in FIG. 7. In this case, optical signals delivered from the wavelength dropping section 51 are directly inputted to optical switching circuits 57 (57-1, 57-2, . . . and 57-N). Subsequently, one of the optical signals is derived by the selecting operation of each of the optical switching circuits 57, and it is outputted to the corresponding one of wavelength conversion units 58 (58-1, 58-2, . . . and 58-N). On this occasion, the wavelength conversion units 58 convert the inputted optical signals into optical signals corresponding to wavelength Nos. 1-N, fixedly irrespective of the wavelengths of the inputted lights. That is, the wavelengths of the lights to be outputted by the wavelength conversion units 58 are respectively predetermined. Thus, the respective wavelength conversion units 58 output the optical output signals OUT-1, OUT-2, . . . and OUT-N of the predetermined wavelengths.

Meanwhile, a technique wherein the wavelengths of outputs can be variably controlled by a single transmitting optical module has been proposed. Even with the technique, the wavelength varying function thereof can be incarnated by employing the wavelength converting section of the present invention.

Figure 8:
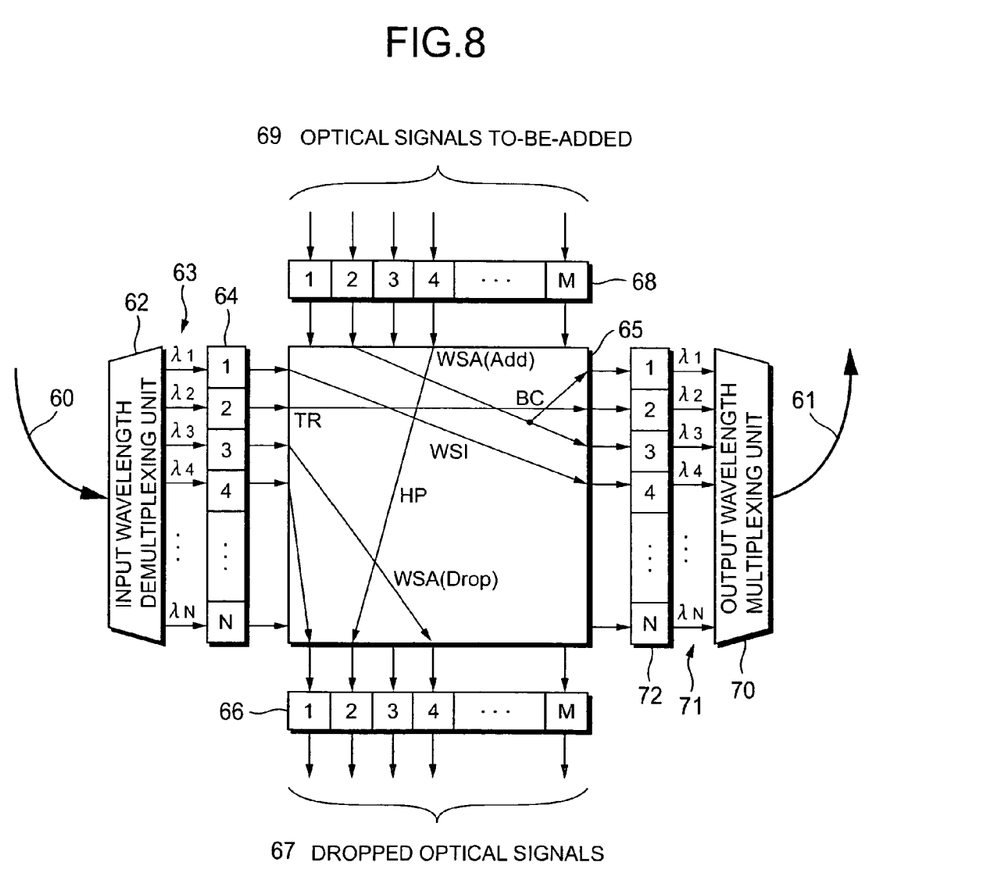
FIG. 8 is a block diagram showing the construction of a drop/add type wavelength multiplexer in another embodiment of the present invention.

There will now be described an embodiment of a wavelength multiplexer in which routes for all the optical signals of "drop" signals, "add" signals and "through" signals are set by a single selection unit. FIG. 8 shows an example of construction in the case where signals corresponding to all wavelengths are substituted into electric signals. A wavelength-multiplexed optical signal 60 is demultiplexed into individual wavelengths by an input wavelength demultiplexing unit 62. The resulting optical signals 63 (wavelengths λ1, λ2, λ3, . . . and λN) are converted into electric signals by an optoelectric signal conversion unit (O/E conversion) 64 at the succeeding stage. Besides, optical signals (adding optical signal) 69 of predetermined wavelengths to be added from outside the wavelength multiplexer are converted into electric signals by an optoelectric conversion unit (O/E conversion) 68. Here, the electric signals of such two groups are inputted to an electric switching circuit unit 65. In the electric switching circuit unit 65, both routes for signals 61 to be delivered to an output wavelength multiplexing unit 70 and for signals to be delivered (as dropped signals 67) outside the wavelength multiplexer can be connected at will by the operations of space switches. The output optical signals 71 to be delivered to the wavelength multiplexing unit 70 are optical signals (wavelengths: λ1, λ2, λ3, . . . and λN) generated in such a way that electric signals from the electric switching circuit unit 65 are converted by an electrooptic signal conversion unit 72. The optical signals (wavelengths: λ1, λ2, λ3, . . . and λN) 71 are wavelength-multiplexed by the wavelength multiplexing unit 70, and are outputted as output light 61. The dropped signals 67 are optical signals generated in such a way that electric signals from the electric switching circuit unit 65 are converted by an electrooptic signal conversion unit 66.

Here in FIG. 8, how to connect desired channels is exemplified. The routes of ordinary "drop" and "add" signals are indicated as WSA (Wavelength Slot Assignment). By way of example, symbol WSA (Drop) denotes the dropping channel. Regarding this dropping channel, light of wavelength λ3 is inputted to the portion 4 of the electrooptic signal conversion unit 66 by the electric switching circuit unit 65 and is converted into a desired wavelength, which is outputted as the dropped optical signal 67. The adding channel denoted by symbol WSA (Add) may be similarly considered. The optical signal to-be-added 69 inputted to the portion 2 of the optoelectric conversion unit 68 is outputted to the portion 3 of the electrooptic conversion unit 72 and is converted into the optical signal of the wavelength λ3, which is delivered to the multiplexing unit 70. Discrepancy in the ratios between the numbers of "through" channels and the numbers of "drop/add" channels in individual nodes can be adjusted by making it possible to set at will the number (N) of wavelengths to be inputted and the number (M) of signals to be dropped/added. Thus, the range of applications to node apparatuses widens.

Here, symbol WSI (Wavelength Slot Interchange) denotes a wavelength converting route. In this case, it corresponds to the installation of the wavelength converting section according to the present invention to secure the wavelength converting route in a space switch. In the example of FIG. 8, input optical signal of wavelength λ1 is converted into optical signal of wavelength λ4, which is outputted.

Further, as shown in FIG. 8, the apparatus of this embodiment can accommodate an ordinary "through" channel (TR: Through), a connection channel (HP: Hairpin) established between an "add" optical signal and a "drop" optical signal, a broadcast type channel (BC: Broadcast) in which an added optical signal is outputted as a plurality of wavelength signals, and so forth.

Optical signal to-be-added which is inputted to the portion 4 of the optoelectric conversion unit 68, is delivered as dropped optical signal to the portion 2 of the electrooptic conversion unit 66 (Hairpin). Besides, optical signal to-be-added inputted to the portion 2 of the optoelectric conversion unit 68 is delivered as branched optical signal to the portions 1 (λ1) and 3 (λ3) of the electrooptic conversion unit 66 (Broadcast). Incidentally, the constituents themselves of such space switches have been known. They are introduced in, for example, Gerd Keiser: "Optical Fiber Communications: Second Edition" published by McGRAW-HILL Inc., section 11.4 PHOTONIC SWITCHING.

Figure 9:
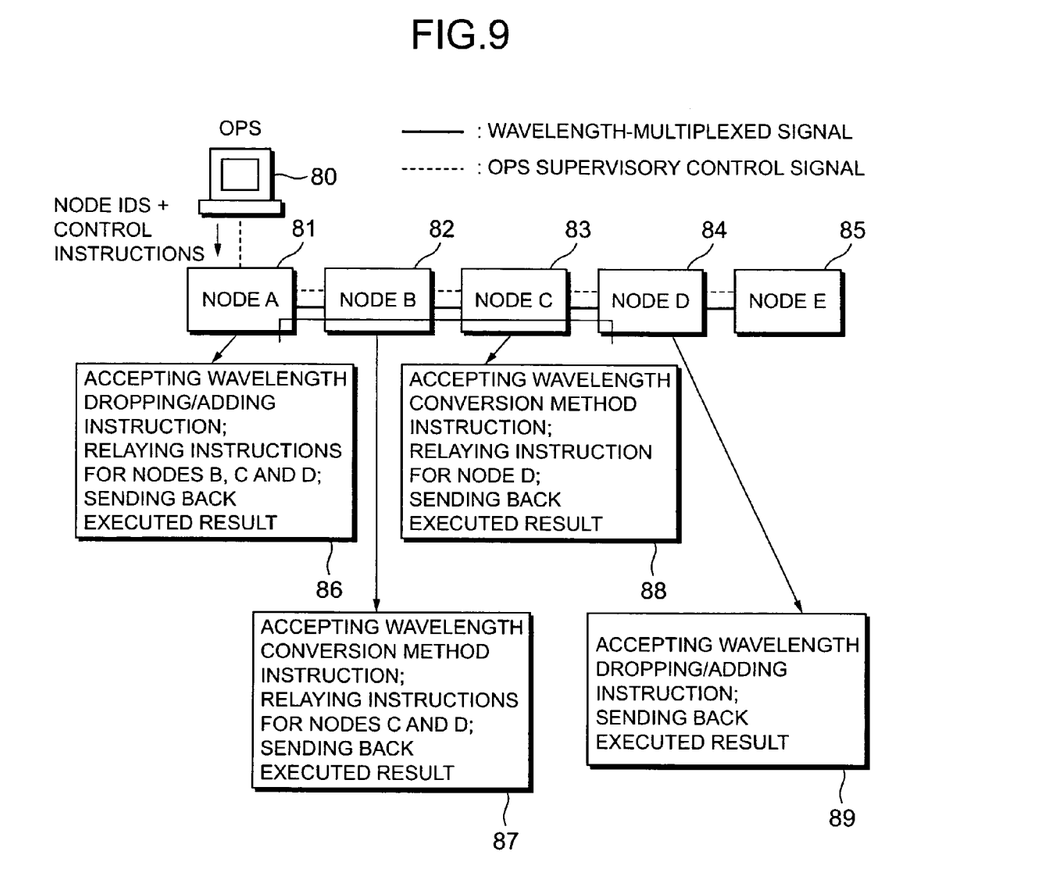
FIG. 9 is a diagram showing a linear network in an embodiment of the present invention.
Figure 10:
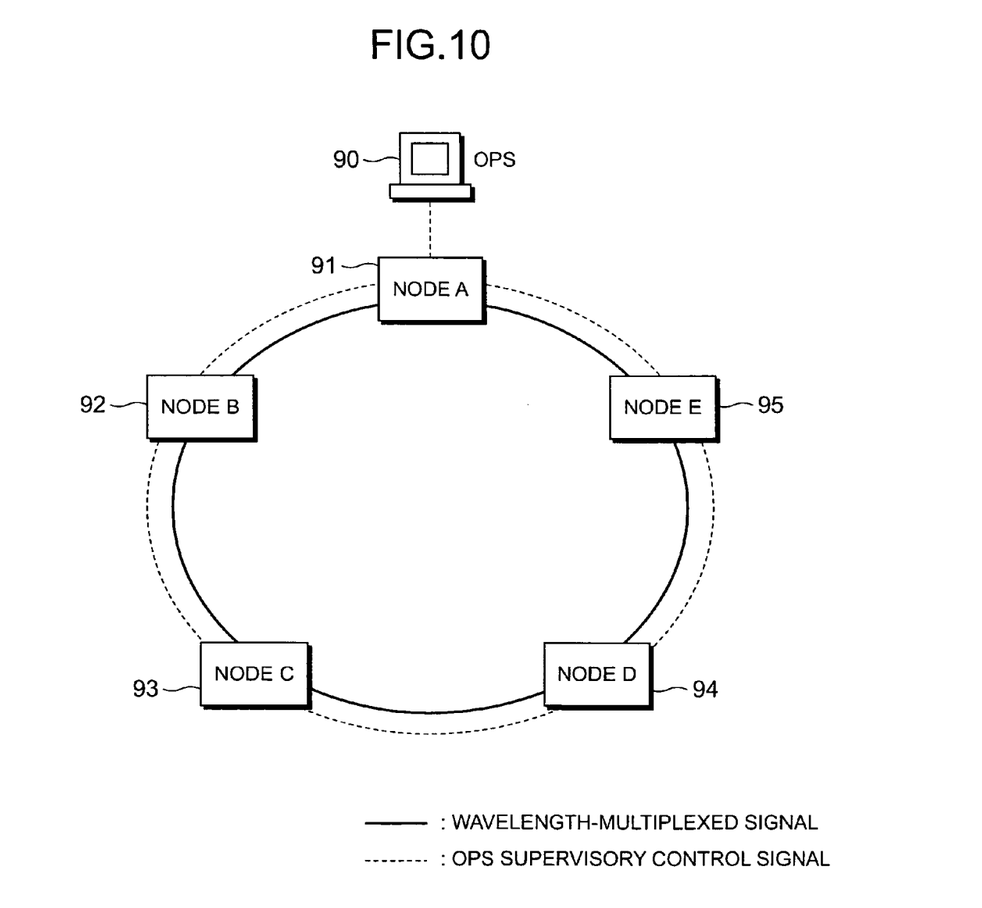
FIG. 10 is a diagram showing a ring network in an embodiment of the present invention.
Figure 11:
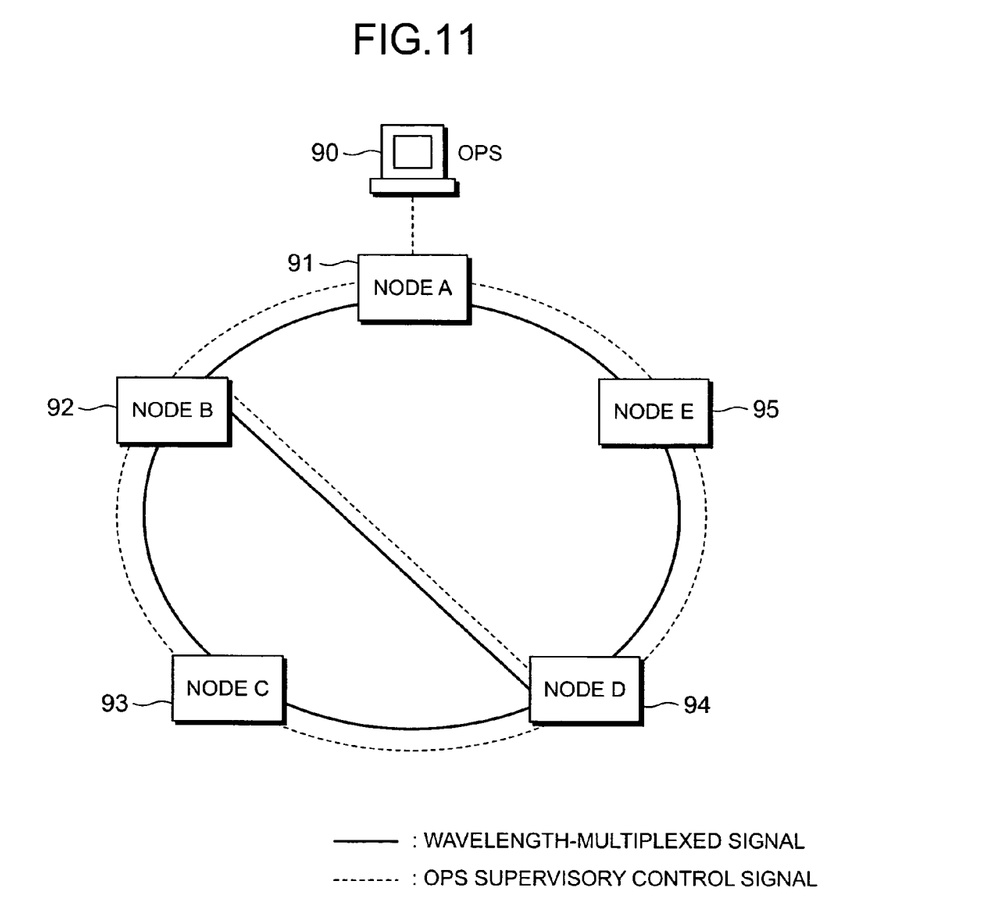
FIG. 11 is a diagram showing a meshed network in an embodiment of the present invention.

Network architectures in each of which a plurality of wavelength multiplexers according to the present invention are connected, are shown in FIG. 9, FIG. 10 and FIG. 11. An embodiment in FIG. 9 is a network scheme called "linear network", in which node apparatuses 81, 82, . . . and 85 are connected in one row. Besides, an embodiment in FIG. 10 is a network scheme called "ring network", in which node apparatuses 91, 92, . . . and 95 are connected in the shape of a ring. Further, an embodiment in FIG. 11 is a so-called "meshed network". The minimum network unit constructed in the linear network or the ring network is termed a "subnetwork". In general, the network is constituted by a plurality of subnetworks. An operation system (OPS) 80 or 90 is connected in common in any of the networks. The OPS has the man-machine interface of an administrator, and it includes hardware such as a workstation or a personal computer, various items of supervisory control software, and means for communications with the node apparatuses.

Here, the administrator gives the OPS a command concerning a channel which is to be actually opened. It is assumed by way of example that a request for adding a channel from the node apparatus A to the node apparatus D has occurred. Then, the administrator commands the OPS to add the channel. Subsequently, wavelengths to be actually used in individual zones are selected. Regarding the selection of the wavelengths, the OPS may display the situation of uses of wavelengths on the screen of a console or the like and prompt the administrator to select the wavelengths, or the OPS may well select the wavelengths autonomously under a software control. Here will be explained a method in which the OPS autonomously selects the wavelengths of the respective zones in compliance with the channel setting request in the network including the multiplexers of the present invention.

In each of FIGS. 9, 10 and 11, thick lines indicate the routes of main wavelength-multiplexed signals, and dotted lines indicate the routes of supervisory control signals from the OPS. The supervisory control signals between the respectively adjacent node apparatuses are transferred by, for example, employing wavelengths different from those of the main signal and multiplexing them into a single fiber together with the main signal. Further, in FIG. 9, examples of operations are indicated for the respective node apparatuses 81, 82, 83 and 84. Besides, FIG. 12 is a flow chart for plainly elucidating examples of operations in the optical network of the present invention.

The OPS is always supervising the situation of uses of wavelengths in subnetworks controlled by itself. It is assumed by way of example that a user of the channel has made a request for adding a channel from the node apparatus A to the node apparatus D (100 in FIG. 12). Upon receiving the request, the administrator of the channel, for example, inputs a command to the effect of connecting the above the circuit channel, from a terminal (for example, personal computer (PC) or workstation (WS)) (101 in FIG. 12). Then, the OPS searches for the situation of uses of wavelengths in the node apparatuses A (81), B (82), C (83) and D (84) (102 in FIG. 12). In accordance with the result of the search, the OPS determines wavelengths which are to be used between the adjacent node apparatuses (103 in FIG. 12). Subsequently, the OPS gives the commands of "dropping/adding certain wavelengths" to the node apparatuses A (81) and D (84). Further, the OPS gives the commands of "wavelength conversion methods" to the node apparatuses B (82) and C (83) which are midway node apparatuses. Concretely, the OPS transfers supervisory control signals containing commands corresponding to the instructions, by the communication means (104 in FIG. 12). The operations of the node apparatuses responsive to the above operations are indicated in FIG. 9. That is, each of the nodes A (81) and D (84) executes "Accepting wavelength dropping/adding command" (86 or 89), while each of the nodes B (82) and C (83) executes "Accepting wavelength conversion method instruction" (87 or 88).

Figure 12:
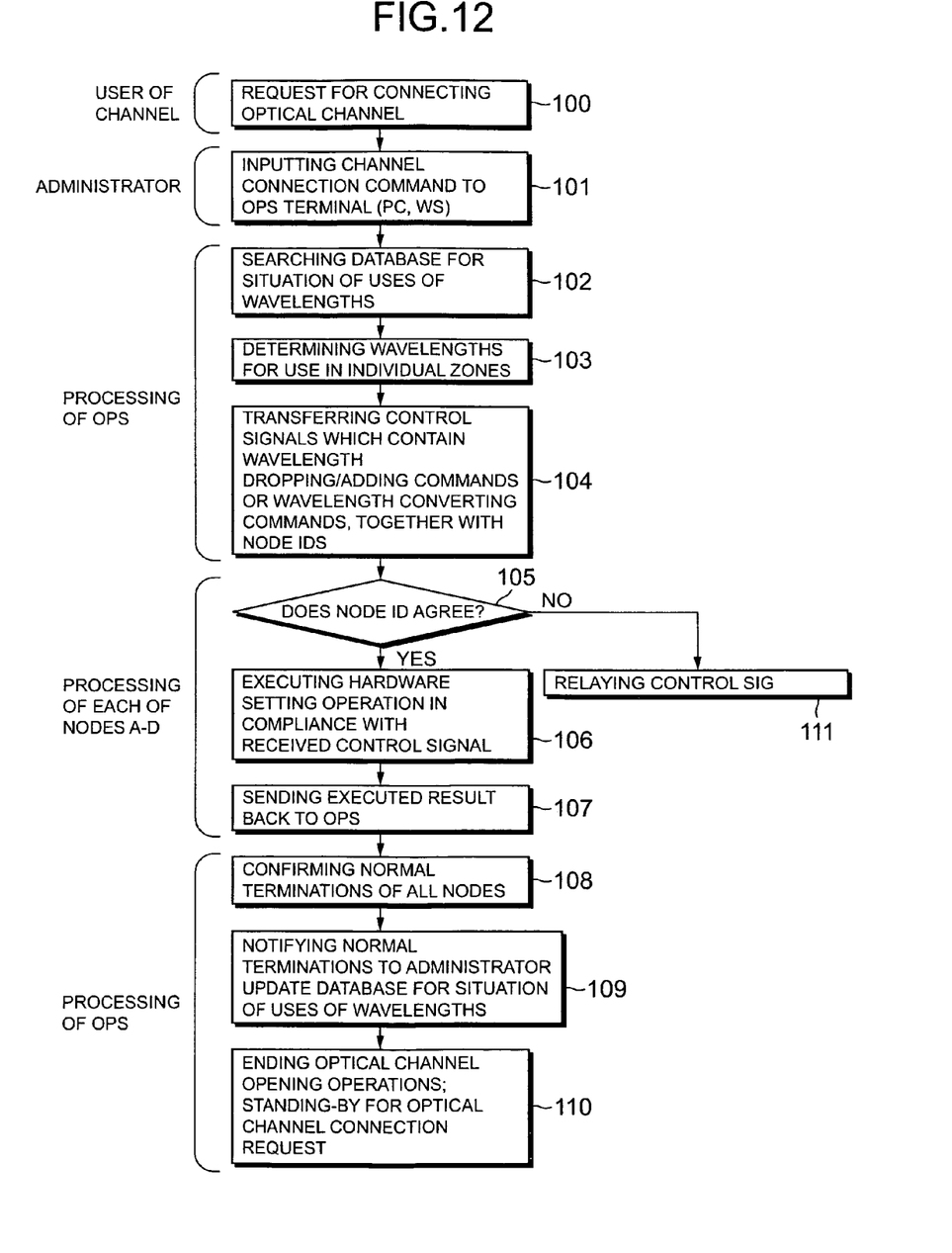
FIG. 12 is a flow chart for explaining examples of operations in the network in an embodiment of the present invention.

Each of the node apparatuses A (81), B (82), C (83) and D (84) having received the supervisory control signals judges whether or not the transferred supervisory control signal is the instruction for its own node, by checking a node identifier (usually termed "node ID") affixed to the transferred signal (105 in FIG. 12). In a case where, as a result, the supervisory control signal is the instruction for the node apparatus, this node apparatus executes an internal hardware setting operation complying with the instruction (106 in FIG. 12), and it sends an executed result back to the OPS (107 in FIG. 12). In a case where the node ID disagrees with that of the node apparatus, this node apparatus relays the received control signal to the node apparatus of the succeeding stage (111 in FIG. 12). More specifically, among the instructions received by the node A (81), the instructions for the nodes B, C and D bear the affixed node identifiers which disagree with the node identifier of the node A itself, so that the node apparatus A (81) relays them to the node apparatus B (82) of the succeeding stage. Subsequently, among the instructions received by the node B (82), the instructions for the nodes C and D bear the affixed node identifiers which disagree with the node identifier of the node B itself, so that the node apparatus B (82) relays them to the node apparatus C (83) of the succeeding stage. Thereafter, similar operations are executed in the node apparatuses C and D. The above operations of the node apparatuses are indicated in FIG. 9. That is, the nodes A (81), B (82) and C (83) execute "Relaying instructions for nodes B, C and D", "Relaying instructions for nodes C and D" and "Relaying instruction for node D" (86, 87 and 88), respectively. Besides, the executed result of the hardware setting operation in each node apparatus is sent back to the OPS as "Sending back executed result" (86, 87, 88 or 89).

After having confirmed the normal terminations of all the node apparatuses (108 in FIG. 12), the OPS notifies the results to the operator or the administrator. Besides, the OPS updates the situation of uses of wavelengths in the subnetworks (109 in FIG. 12). Thus, the series of channel opening operations are ended (110 in FIG. 12), and the ordinary service of the channel is started. Then, the OPS falls into a usual standby state.

The operations of the linear network have been explained above by way of example. However, the ring network or the meshed network can also be operated in like fashion except alterations based on a different circuit arrangement.

According to the present invention, it is possible to provide a wavelength multiplexer which can easily add new channels, and a wavelength-multiplexed transmission network which employs such wavelength multiplexers.

What is claimed is:

1. An optical transmission apparatus which receives first wavelength multiplexed optical signals from a first optical transmission path, and transmits at least a portion of the optical signals having respectively different wavelengths, included in the first wavelength multiplexed optical signals, to a second optical transmission path, the optical transmission apparatus comprising:

a wavelength demultiplexing unit which demultiplexes the first wavelength multiplexed optical signals into a plurality of optical signals with respectively different wavelengths;

a dropping unit which drops at least a portion of optical signals included in the plurality of optical signals that have passed through the wavelength demultiplexing unit;

a wavelength converting unit which converts wavelength of at least a portion of optical signals included in a plurality of optical signals that have passed through the dropping unit without being dropped;

a wavelength adding unit which adds other optical signals imputed from outside the apparatus, to a plurality of optical signals that have passed through the wavelength converting unit; and a wavelength multiplexing unit which multiplexes wavelengths of a plurality of optical signals that have passed through the wavelength adding unit wherein, an operation system, which controls usage situation of wavelength in the optical transmission apparatus, gives notification of a wavelength that is not used in the second optical transmission path, the wavelength converting unit converts, among a plurality of optical signals that have passed through the dropping unit, the wavelength of an optical signal whose wavelength is the same as the wavelength of an optical signal added by the wavelength adding unit, to said wavelength that is available to be used in the second optical transmission path.

2. An optical transmission apparatus according to claim 1 wherein,
the wavelength not being used in the second optical transmission path is the wavelength of an optical signal dropped by the dropping unit.

3. An optical transmission apparatus which receives first wavelength multiplexed optical signals from a first optical transmission path, and transmits at least a portion of optical signals having respectively different wavelengths, included in the first wavelength multiplexed optical signals, as second wavelength multiplexed optical signals, to a second optical transmission path, the optical transmission apparatus comprising:
a wavelength demultiplexing unit which demultiplexes the first wavelength multiplexed optical signals into a plurality of optical signals with respectively different wavelengths;
a dropping unit which drops at least a portion of optical signals included in the plurality of optical signals that have passed through the wavelength demultiplexing unit;
a wavelength converting unit which converts wavelength of at least a portion of optical signals included in a plurality of optical signals that have passed through the dropping unit without being dropped;
a wavelength adding unit which adds other optical signals inputted from outside the apparatus, to a plurality of optical signals that have passed through the wavelength converting unit; and
a wavelength multiplexing unit which multiplexes wavelengths of a plurality of optical signals that have passed through the wavelength adding unit; wherein,
the wavelength converting unit converts the wavelength of an optical signal of at least a portion of plurality of optical signals that have passed through the dropping unit, into a wavelength of an optical signal that has been dropped by the dropping unit, and
the optical transmission apparatus notifies the operation system, which controls usage situation of wavelength in the optical transmission apparatus, that the first wavelength of the first optical transmission path has been converted to the second wavelength of the second optical transmission path.

4. An optical transmission apparatus according to claim 3 wherein,
the wavelength converting unit converts, among a plurality of optical signals that have passed through the dropping unit, the wavelength of an optical signals whose wavelength is the same as the wavelength of an optical signal added by the wavelength adding unit.

5. An optical transmission apparatus which receives first wavelength multiplexed optical signals from a first optical transmission path, and transmits at least a portion of optical signals having respectively different wavelengths, included in the first wavelength multiplexed optical signals, as second wavelength multiplexed optical signals, to a second optical transmission path, the optical transmission apparatus comprising:
a wavelength demultiplexing unit which demultiplexes the first wavelength multiplexed optical signals into a plurality of optical signals with respectively different wavelengths;
a dropping unit which drops at least a portion of optical signals included in the plurality of optical signals that have passed through the wavelength demultiplexing unit;
a wavelength converting unit which converts wavelength of at least a portion of optical signals included in a plurality of optical signals that have passed through the dropping unit without being dropped;
a wavelength adding unit which adds other optical signals inputted from outside the apparatus, to a plurality of optical signals that have passed through the wavelength converting unit; and
a wavelength multiplexing unit which multiplexes wavelengths of a plurality of optical signals that have passed through the wavelength adding unit; wherein,
the wavelength converting unit converts the wavelength of an optical signal of at least a portion of plurality of optical signals that have passed through the dropping unit, into a wavelength of an optical signal that has been dropped by the dropping unit, and
the optical transmission apparatus notifies an operation result, executed in accordance with instructions provided by the operating system to the operation system that controls usage situations of wavelength in the optical transmission apparatus.

6. An optical transmission apparatus according to claim 5 wherein,
the wavelength converting unit converts, among a plurality of optical signals that have passed through the dropping unit, the wavelength of an optical signals whose wavelength is the same as the wavelength of an optical signal added by the wavelength adding unit.

* * * * *